UNITED STATES PATENT OFFICE.

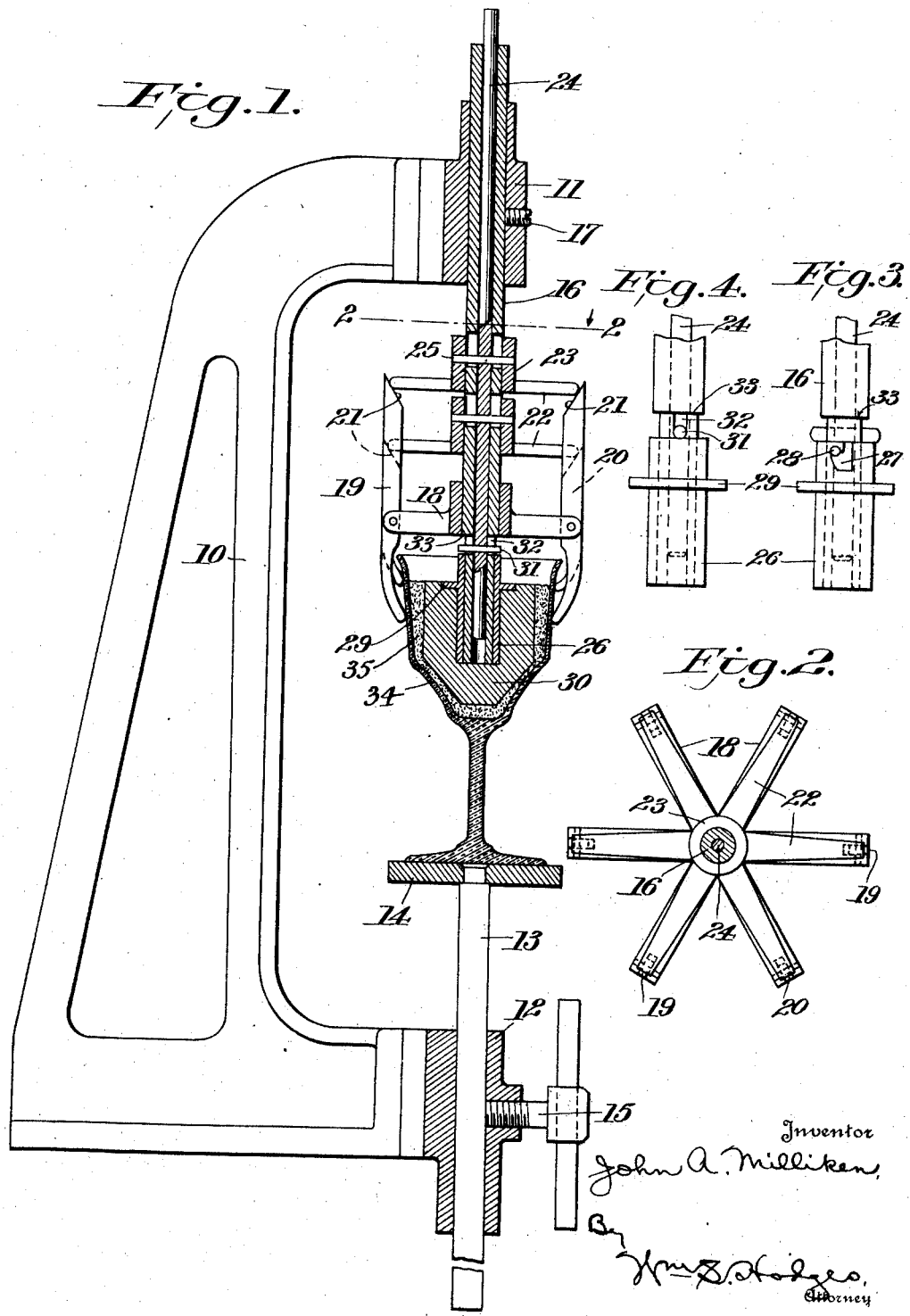

JOHN A. MILLIKEN, OF BAYONNE, NEW JERSEY, ASSIGNOR TO JOHN E. MARSDEN, OF ATLANTIC CITY, NEW JERSEY.

ART OF ORNAMENTING GLASS ARTICLES.

1,396,691.      Specification of Letters Patent.      Patented Nov. 8, 1921.

Application filed December 2, 1916. Serial No. 134,747.

*To all whom it may concern:*

Be it known that I, JOHN A. MILLIKEN, a citizen of the United States, residing at Bayonne, in the county of Hudson and State of New Jersey, have invented new and useful Improvements in the Art of Ornamenting Glass Articles, of which the following is a specification.

This invention is an improvement in the art of applying ornamental designs to the surfaces of glass articles.

It is well known that many attempts have heretofore been made to produce automatic machines for applying ornamental designs to the surfaces of glass articles, such as tumblers, goblets, and the like, but that these attempts have, in the main, failed both practically and commercially, because of the difficulty in solving the problem of compensating for the variations in the size, and inequalities in the surfaces of the articles which are successively presented to the machine. In those rare instances where these difficulties have been overcome to any degree whatever, considerable difficulty is encountered, and much loss entailed, by reason of the breaking of the articles when they are brought into contact with the grinder, or other device used to apply the design, and as a consequence, prior to this invention, the automatic work has been limited to very simple designs upon articles of exceedingly simple contour.

One of the objects of the invention is to overcome all of the above mentioned difficulties, by making provision whereby tumblers, goblets, and other similar articles, of fancy shapes, may be successfully subjected to the action of an automatic machine, irrespective of variations and inequalities in the articles, whereby surface ornamentation may be applied thereto without danger of breaking the article.

The invention will be hereinafter fully set forth and particularly pointed out in the claims.

In the accompanying drawing:—

Figure 1 is a side elevation, partly in section illustrating the invention. Fig. 2 is a transverse sectional view on the line 2—2, Fig. 1. Fig. 3 is a detail view illustrating the chuck, and Fig. 4 is a view thereof at right angles to Fig. 3.

Referring to the drawing, 10 designates a frame provided with upper and lower guide ways 11 and 12, respectively. Slidably mounted in the lower guide 12 is the shank 13 of an article supporting table 14, said table being held in any desired adjusted position vertically, by means of a set screw 15.

Extending through the upper guide 11, is a tubular chuck carrier 16, retained in adjusted position within said guide, by means of a set screw 17. Rigidly secured to said chuck carrier is the hub of a spider 18, pivotally supporting two sets of centering arms 19 and 20, respectively, the arms 19 being in a plane different from that of the arms 20. Said arms are provided with inclined cam-like ends 21, to be engaged by pins 22, carried by hubs 23, slidably mounted on the chuck carrier 16, and attached to a rod 24, extending through the bore of said chuck carrier, by means of pins extended through slots formed in the latter, as indicated at 25. The rod 24 may be reciprocated in suitable manner, as by a treadle or hand lever, not shown.

The lower end of the chuck carrier is reduced in diameter to slidably receive a tubular chuck 26, having a bayonet slot 27, to receive a pin 28, secured to the carrier, by means of which the chuck may be detachably held in position on the end of said carrier. Said chuck is preferably provided with a flange 29, to form a bearing upon the upper end of a filler block 30, into which said chuck projects. Movement of the rod 24 is limited by means of pin 31, extending through slot 32, in the chuck carrier, said pin forming an abutment coöperating with the upper end of the chuck 26, and the shoulder 33, respectively.

In practice, the table 14 is adjusted to the proper position for the particular size of the article that is to be ornamented, and secured in said adjusted position by means of the set screw 15. The article, such as a goblet 34, is then placed upon said table, the filler block 30 and chuck 26 extending thereinto, the chuck being engaged with the chuck carrier 16, through the medium of the bayonet slot and pin connection. The rod 24 is then lowered until the pins 31 abut against the upper end of the chuck, the movement of said rod to this position causing the pins 22, to engage the cam ends 21, of the centering arms 19 and 20, whereupon said arms are rocked so as to engage the periphery of the goblet and to position the latter so as to center the chuck 26, and filler block 30, therein. The goblet is then retained in this position long enough to permit the operator to pour into the same a cementing material, such for instance as melted paraffin, which will fill the space between the wall of the goblet and the filler block, and when cooled will firmly cement the filler block and chuck to the goblet so that all of them may be handled as a single unitary device. Any suitable cementing material may be used, wax being mentioned merely for illustrative purposes, and because the same melts at a low temperature and quickly hardens. After the wax has hardened, the movement of rod 24 is reversed, to permit the goblet to be withdrawn from engagement with the arms 19 and 20, the chuck and the goblet attached thereto, being disengaged by means of the bayonet slot connection. After removal the goblet and the attached chuck may be attached to the chuck shaft of a glass cutting machine, and the cutting operations performed automatically, and by reason of the fact that the goblet has been centered with respect to the chuck, no difficulty will be encountered because of inequalities in the surface of the article, and the cementing material 35, together with the filler block 30, so strengthens and backs up the fragile material of said article, as to enable it to withstand all of the strains of the cutting operation without breaking. After the cutting operation has been completed, the article is immersed in hot water, or heated in any other suitable manner to soften the cementing material 35, thereby permitting removal of the chuck and filler block, which are then in condition to be used for a repetition of the operation upon another article.

From the foregoing it will be readily understod that one operator may be employed in positioning the chucks within the articles and cementing them together, and another operator may be employed in subjecting the articles to the cutting operations, and that the said articles may stand an indefinite time beween the chuck attaching step and the ornamenting step.

I claim as my invention:—

1. An improvement in the art of ornamenting hollow glass articles comprising inserting a chuck into the article without contacting therewith, temporarily attaching the chuck and the article by an interposed material capable of being applied in molten condition, subjecting the article to the action of an ornamenting apparatus by connecting the chuck and the attached article to said apparatus, and finally changing the physical condition of the interposed material to permit of separation of the chuck and the attached article.

2. An improvement in the art of ornamenting hollow glass articles comprising inserting a chuck into the article without contacting therewith, temporarily attaching the chuck and the article by an interposed material, applying a design to the exterior surface to the article while attached to the chuck and finally altering the physical consistency of the interposed material to permit of separation of the chuck and the attached article.

3. An improvement in the art of ornamenting hollow glass articles comprising passing a chuck into the article without contacting therewith, centering the chuck with respect to the article, cementing the centered chuck to said article, and applying a design to the article while united to the chuck.

4. An improvement in the art of ornamenting hollow glass articles comprising passing a chuck into the article without contacting therewith, centering a chuck with respect to the article, filling the space between the chuck and the wall of the article with wax to unite them, applying a design to the article while united to the chuck, and finally softening the wax to permit withdrawal of the chuck.

5. An improvement in the art of ornamenting hollow glass articles comprising passing a chuck into the article without contacting therewith, centering the chuck with respect to the article, filling the space between the centered chuck and the wall of the article with a cementing material of low melting temperature, to unite them, applying a design to the article while united to the chuck, and finally applying heat to soften the cementing material to permit separation of the chuck and the article.

6. An improvement in the art of ornamenting hollow glass articles comprising passing a chuck into the article without contacting therewith, centering the chuck with respect to the article, filling the space between the chuck and the wall of the article with wax to unite them, applying a design to the article while united to the chuck, and finally dipping the article into hot water to soften the wax, whereby the chuck may be separated from the article.

7. As an improvement in the art of ornamenting hollow glass articles a chuck shaped to enter said article, and a material capable of uniting the article to the chuck, said material being of a nature capable of being softened by heat.

8. As an improvement in the art of ornamenting hollow glass articles, a chuck shaped to enter the article, means for centering the chuck with respect to the article and a filling material to be interposed between the centered chuck and the wall of the article to unite them, said material being of a nature to be softened by heat.

9. As an improvement in the art of ornamenting hollow glass articles, a chuck shaped to be inserted into the article, a filler block attached to the chuck and of a diameter less than the diameter of the article, and a filling material to be interposed between filler block and the wall of the article, said filling material being of a low melting temperature.

10. An improvement in the art of ornamenting hollow glass articles, comprising an article support, a chuck carrier, a chuck detachably connected thereto and shaped to be inserted into the article, and means detachably connected with the chuck and positioned to engage an article upon said support for centering the chuck with respect to said article.

11. An improvement in the art of ornamenting glass comprising an article support, a chuck carrier, a chuck detachably connected thereto, a spider attached to said carrier, centering arms carried by said spider and positioned to engage and center the article with respect to the chuck, and means for actuating said centering arms.

12. An improvement in the art of ornamenting glass comprising an article support, a chuck carrier, a chuck detachably connected thereto, centering arms supported by said carrier and positioned to engage the article to center the same with respect to the chuck, pins slidably supported by said carrier and positioned to engage said centering arms, and means for reciprocating said pins.

13. An improvement in the art of ornamenting glass comprising an article support, a tubular chuck carrier, a chuck detachably connected thereto, centering arms supported by said carrier and positioned to engage and center the article with respect to the chuck, a reciprocable operating rod within said chuck carrier, and means connected with said rod for engaging said arms to actuate the same.

14. An improvement in the art of ornamenting glass comprising an article support, a tubular chuck carrier, a chuck detachably connected thereto, centering arms supported by said carrier and positioned to engage and center the article with respect to said chuck, said arms having cam ends, a reciprocable operating rod within said chuck carrier, and operating pins for said centering arms, said pins being slidably supported by said chuck carrier and connected with said operating rod.

In testimony whereof I have hereunto set my hand in presence of two subscribing witnesses.

JOHN A. MILLIKEN.

Witnesses:
 FREDERICK W. POPE.
 DAISY M. VAN VALEN.